US012602153B2

(12) United States Patent
Liu et al.

(10) Patent No.: US 12,602,153 B2
(45) Date of Patent: Apr. 14, 2026

(54) SIGNAL TRACKING AND OBSERVATION SYSTEM AND METHOD

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 94 days.

(21) Appl. No.: 18/518,488

(22) Filed: Nov. 23, 2023

(65) Prior Publication Data

US 2025/0173057 A1     May 29, 2025

(51) Int. Cl.
*G06F 3/0481*      (2022.01)
*G06F 3/0486*      (2013.01)

(52) U.S. Cl.
CPC .......... *G06F 3/0486* (2013.01); *G06F 3/0481* (2013.01)

(58) Field of Classification Search
None
See application file for complete search history.

(56) References Cited

U.S. PATENT DOCUMENTS

| | | | |
|---|---|---|---|
| 7,496,846 B2 | 2/2009 | Malmstrom | |
| 8,924,876 B1 | 12/2014 | Joyce et al. | |
| 10,838,614 B2 | 11/2020 | Storr et al. | |
| 11,556,746 B1 * | 1/2023 | Dasgupta ............... | G06N 20/00 |

| | | | |
|---|---|---|---|
| 2004/0001094 A1 * | 1/2004 | Unnewehr ............ | G06F 3/0486 |
| | | | 715/769 |
| 2005/0039170 A1 | 2/2005 | Cifra et al. | |
| 2007/0016872 A1 * | 1/2007 | Cummins ............. | G06F 16/162 |
| | | | 715/837 |
| 2016/0124605 A1 | 5/2016 | Covington et al. | |

(Continued)

FOREIGN PATENT DOCUMENTS

| | | |
|---|---|---|
| CN | 101452403 A | 6/2009 |
| CN | 109522019 A | 3/2019 |

(Continued)

OTHER PUBLICATIONS

Yanwu Hang, "CANoe Basic Tutorial 03: Analysis Window-Graphic", Aug. 8, 2023, pp. 1-17 (Year: 2023).*

(Continued)

*Primary Examiner* — Tuyetlien T Tran
(74) *Attorney, Agent, or Firm* — Bayramoglu Law Offices LLC

(57) ABSTRACT

A signal tracking and observation system includes: at least one bus adapter, configured to obtain signal data from a debugging device; at least one computer device, including a processor, a display communicating with the processor to present a graphic interface, a readable storage medium, a communication bus, and a communication interface; wherein the processor, the readable storage medium, and the communication interface communicate with the bus adapter via the communication bus; the readable storage medium is configured to store an instruction program; the processor is configured to, after the signal data is obtained, execute the instruction program; the display is configured to display at least one signal observation window by the graphic interface.

17 Claims, 11 Drawing Sheets

S101 multiple signal observation windows are set, where each of the signal observation windows is configured to include a corresponding signal presentation attribute.

S102 a signal database is set, a to-be-track-observed signal is selected from the signal database, and the to-be-track-observed signal is added and displayed in one of the signal observation windows, where a region displaying the to-be-track-observed signal in the signal observation window is a to-be-track-observed signal region.

S103 a desired to-be-track-observed signal is selected from the to-be-track-observed signal region to each of other signal observation windows to, with a corresponding signal presentation attribute, present the to-be-track-observed signal, where each signal observation window performs presentation independently.

(56)                References Cited

U.S. PATENT DOCUMENTS

| | | | |
|---|---|---|---|
| 2016/0124635 A1 | 5/2016 | Covington et al. | |
| 2019/0087389 A1 | 3/2019 | Ranjan et al. | |
| 2019/0200887 A1* | 7/2019 | Shinohara | A61B 5/055 |
| 2019/0370155 A1* | 12/2019 | Nanjundappa | G06F 11/3461 |
| 2020/0134934 A1 | 4/2020 | Covington et al. | |
| 2023/0176706 A1 | 6/2023 | Klahm | |

FOREIGN PATENT DOCUMENTS

| | | | |
|---|---|---|---|
| CN | 110874276 A | 3/2020 | |
| CN | 112947815 A | 6/2021 | |
| CN | 113010075 A | 6/2021 | |
| CN | 113312125 A | 8/2021 | |
| CN | 115857780 A | 3/2023 | |
| EP | 3433727 B1 | 1/2025 | |
| JP | 2003525489 A | 8/2003 | |
| JP | 2005332069 A | 12/2005 | |
| JP | 2009245128 A | 10/2009 | |
| JP | 2014074675 A | 4/2014 | |
| JP | 2015197737 A | 11/2015 | |
| JP | 2017117438 A | 6/2017 | |
| JP | 2018086240 A | 6/2018 | |
| RU | 2748176 C1 | 5/2021 | |
| WO | 2006114880 A1 | 11/2006 | |

OTHER PUBLICATIONS

Vector Informatik GMBH, "CANoe and CANalyzer as Diagnostic Tools", Aug. 2, 2022, pp. 1-40 (Year: 2022).*

Yanwu Hang, CANoe Basic Tutorial 01: New Project and Channel Configuration, 2023, pp. 1-20, retrieved from: https://blog.csdn.net/weixin_43360025/article/details/132073075.

Yanwu Hang, CANoe Basic Tutorial 02: Analysis Window—Trace, 2023, pp. 1-26, retrieved from: https://blog.csdn.net/weixin_43360025/article/details/132073385.

Yangwu Hang, CANoe Basic Tutorial 03: Analysis Window-Graphic, 2023, pp. 1-14, retrieved from: https://blog.csdn.net/weixin_43360025/article/details/132128445.

* cited by examiner

S101 multiple signal observation windows are set, where each of the signal observation windows is configured to include a corresponding signal presentation attribute.

S102 a signal database is set; a to-be-track-observed signal is selected from the signal database, and the to-be-track-observed signal is added and displayed in one of the signal observation windows, where a region displaying the to-be-track-observed signal in the signal observation window is a to-be-track-observed signal region.

S103 a desired to-be-track-observed signal is selected from the to-be-track-observed signal region to each of other signal observation windows to, with a corresponding signal presentation attribute, present the to-be-track-observed signal, where each signal observation window performs presentation independently.

FIG. 1

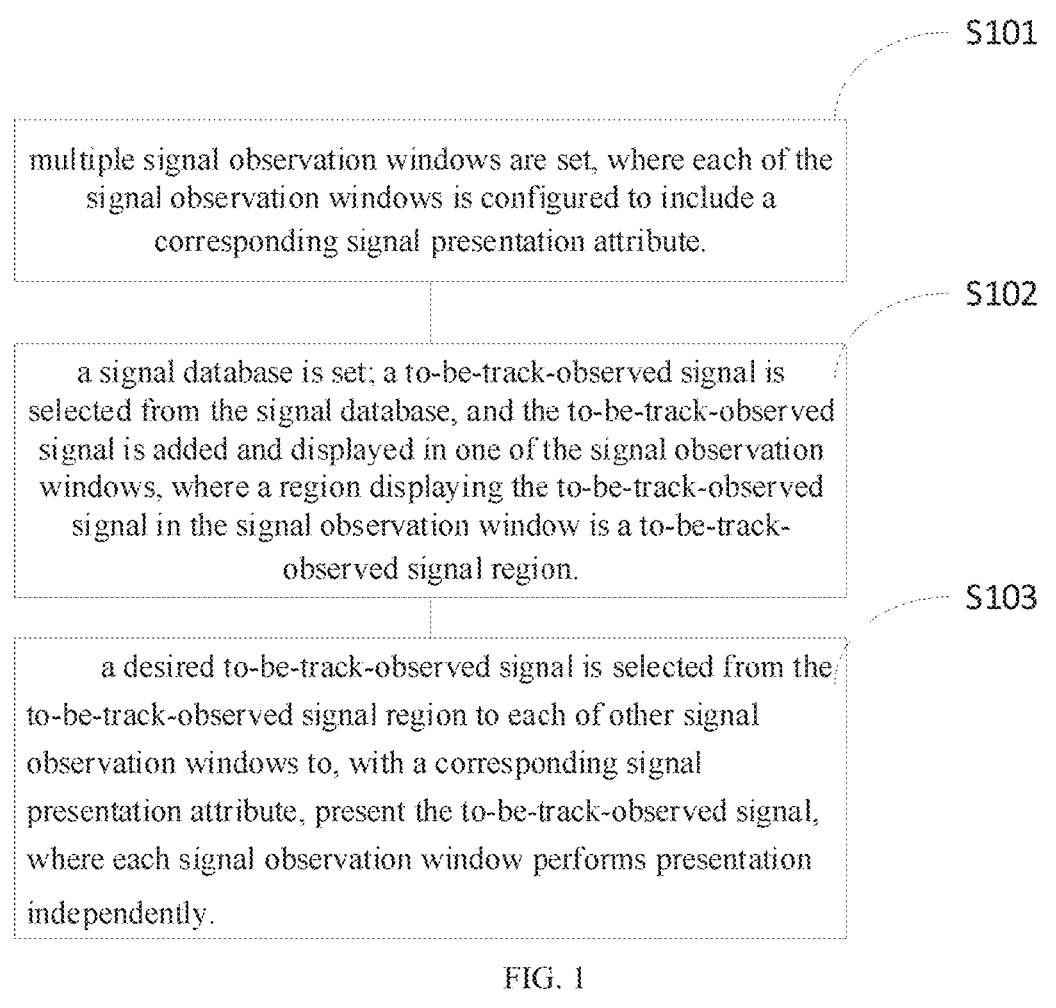

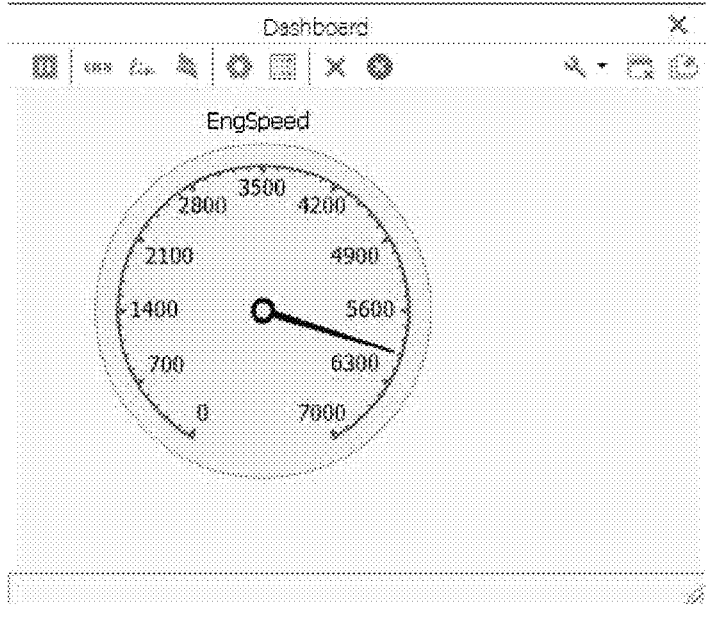
FIG. 6
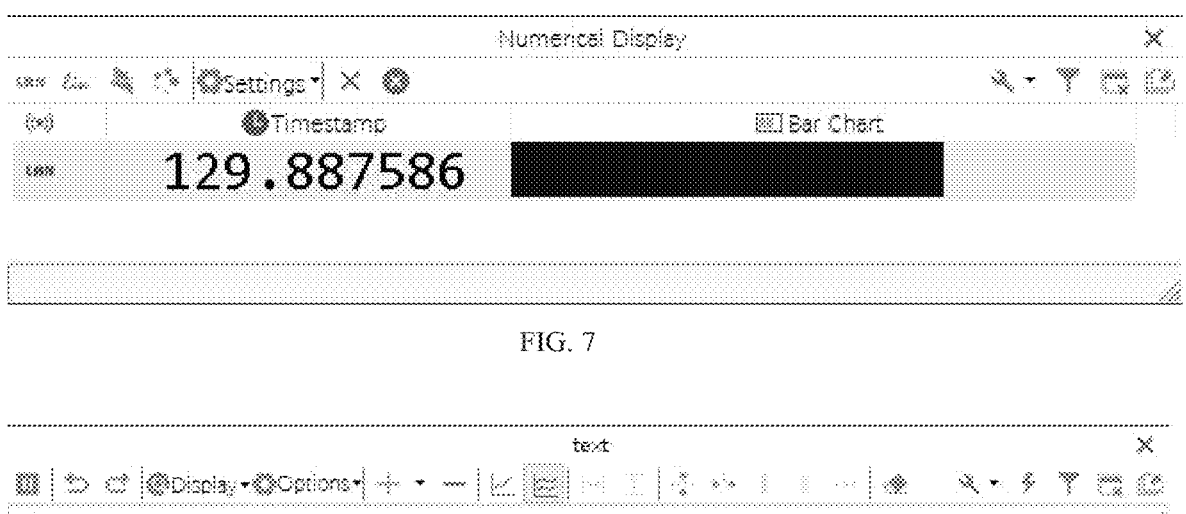
FIG. 7
FIG. 8

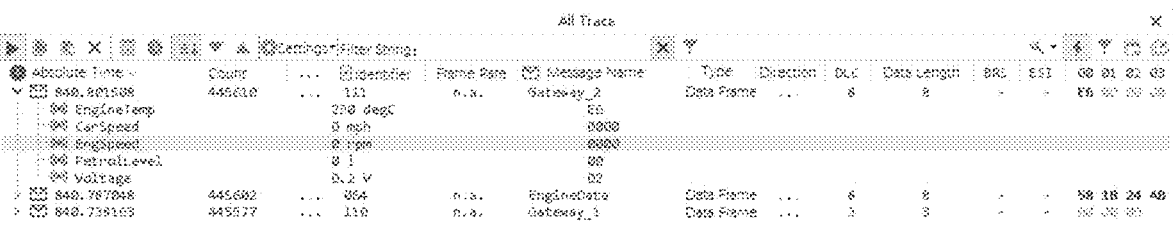
FIG. 13
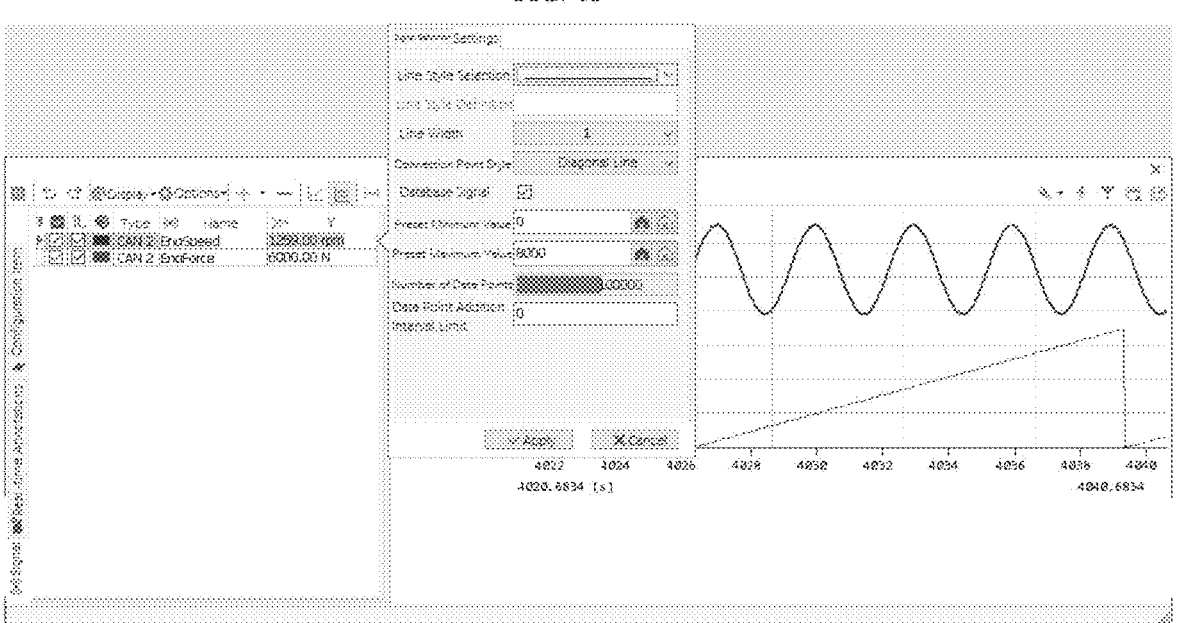
FIG. 14

SIGNAL TRACKING AND OBSERVATION SYSTEM AND METHOD

TECHNICAL FIELD

The present disclosure relates to the field of signal processing technologies, and in particular to a signal tracking and observation method and system, a computer readable storage medium and an electronic device.

BACKGROUND

There are a huge number of signal data entries in signal database information and a user does not view the signals one by one to select a signal to be observed but filters out signal names and views and selects a desired signal from the filtered signal scope. But, usually, there are many signals with a same name in the signal database information and these signals with the same name may come from different channels, different networks, different nodes and different packets and the like. Thus, the user may be easily confused about the signals with the same name and hence cannot select the signal to be observed from the filtered signal scope.

In the scenarios of measurements and tests and the like of vehicular electronic systems, it is required to track and observe signals. In the related arts, the signals are tracked and observed by the following method: a signal observation window (for example, a graphic window, a numerical display window, or a dashboard window or the like) is opened; a button "add signal" is clicked in the signal observation window to pop up a database signal selection window; in the database signal selection window, a to-be-observed signal is selected; and then a confirm button is clicked and the database signal selection window is closed; thus, the to-be-observed signal is added in the signal observation window. In this way, the signals can be tracked and observed.

If the to-be-observed signal is a confounding signal with a same name, when it is required to track and observe the confounding signal in different signal observation windows or track and observe multiple different confounding signals in different signal observation windows, a user needs to perform the operation of selecting a confounding signal several times in a database signal selection window.

SUMMARY

The present disclosure provide a signal tracking and observation system, including:

at least one bus adapter, configured to obtain signal data from a debugging device;

at least one computer device, including a processor, a display communicating with the processor to present a graphic interface, a readable storage medium, a communication bus, and a communication interface; wherein the processor, the readable storage medium, and the communication interface communicate with the bus adapter via the communication bus;

the readable storage medium is configured to store an instruction program;

the processor is configured to, after the signal data is obtained, execute the instruction program to perform the operations of: setting multiple signal observation windows, wherein each of the signal observation windows is configured to display a signal with a corresponding signal presentation attribute; setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; selecting a desired to-be-track-observed signal from the to-be-track-observed signal region to each of other signal observation windows to, with a corresponding signal presentation attribute, present the to-be-track-observed signal, wherein each signal observation window performs presentation independently;

the display is configured to display at least one signal observation window by the graphic interface.

The summary of the present disclosure aims to provide brief descriptions for the subjects of the specification. Thus, it should be understood that the above features are only illustrative and shall not be interpreted as narrowing the scope or essence of the subject of the specification in any way.

Other features, aspects and advantages of the subjects of the present disclosure will become apparent by way of the specific embodiments, drawings and claims.

BRIEF DESCRIPTION OF THE DRAWINGS

In order to more clearly describe the technical solutions in the embodiments of the present disclosure or in the prior arts, the drawings required for descriptions of the specific embodiments or the prior arts will be briefly introduced. Apparently, the drawings described hereunder are only some embodiments of the present disclosure. Those skilled in the arts can obtain other drawings based on these drawings without making creative work.

FIG. 1 is a step diagram illustrating a method of a signal tracking and observation method according to some embodiments of the present disclosure.

FIG. 6 is a schematic diagram illustrating a dashboard window according to some embodiments of the present disclosure.

FIG. 7 is a schematic diagram illustrating a numerical display window with histogram according to some embodiments of the present disclosure.

FIG. 8 is a schematic diagram illustrating a text window according to some embodiments of the present disclosure.

FIG. 13 is a schematic diagram in which a mouse icon displays a drag icon in a case according to some embodiments of the present disclosure.

FIG. 14 is a schematic diagram of a method by which an object display attribute is changed in a graphic window in a case according to some embodiments of the present disclosure.

DETAILED DESCRIPTION OF THE EMBODIMENTS

Figure 2:
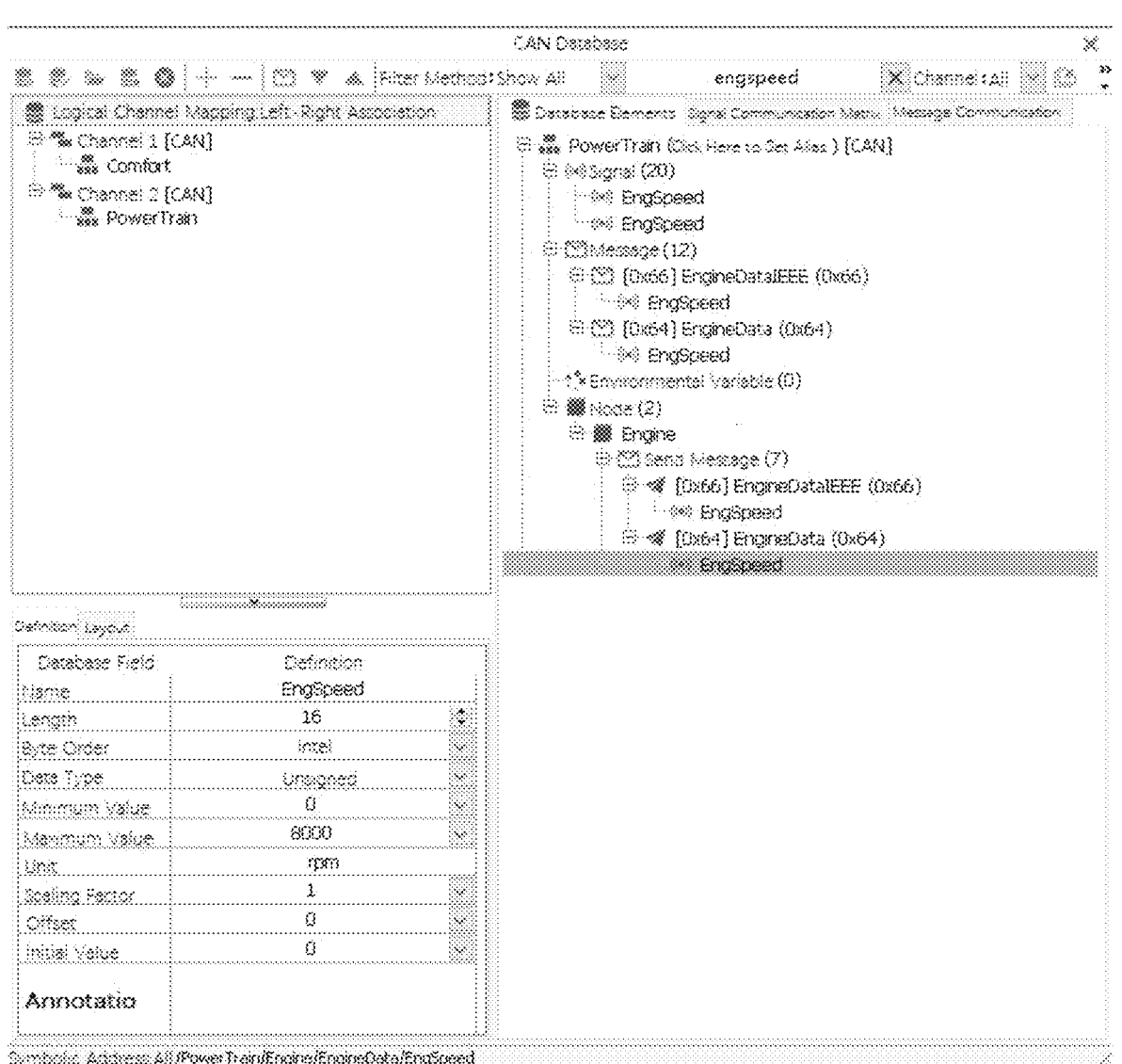
FIG. 2 is a schematic diagram illustrating a CAN signal database according to some embodiments of the present disclosure.

In order to make the object, technical solutions and advantages of the embodiments of the present disclosure clearer, the technical solutions of the present disclosure will be fully and clearly described in combination with drawings. Apparently, the embodiments described herein are only some embodiments rather than all embodiments. All other embodiments obtained by those skilled in the art based on these drawings without making creative work shall fall within the scope of protection of the present disclosure.

There are a huge number of signal data entries in signal database information and a user does not view the signals one by one to select a signal to be observed but filters out signal names and views and selects a desired signal from the filtered signal scope. But, usually, there are many signals with a same name in the signal database information and these signals with the same name may come from different channels, different networks, different nodes and different packets and the like. Thus, the user may be easily confused about the signals with the same name and hence cannot select the signal to be observed from the filtered signal scope.

In the scenarios of measurements and tests and the like of vehicular electronic systems, it is required to track and observe signals. In the related arts, the signals are tracked and observed by the following method:

a signal observation window (for example, a graphic window, a numerical display window, or a dashboard window or the like) is opened; a button "add signal" is clicked in the signal observation window to pop up a database signal selection window; in the database signal selection window, a to-be-observed signal is selected; and then a confirm button is clicked and the database signal selection window is closed; thus, the to-be-observed signal is added in the signal observation window. In this way, the signals can be tracked and observed.

In this case, the following problems will be brought: if the to-be-observed signal is a confounding signal with a same name, when it is required to track and observe the confounding signal in different signal observation windows or track and observe multiple different confounding signals in different signal observation windows, a user needs to perform the operation of selecting a confounding signal several times in a database signal selection window. In this case, the signal selection efficiency is low, and incorrect signals may be easily selected, so as to significantly reduce the efficiency of the signal tracking and observation.

Therefore, one or more embodiments provide a signal tracking and observation method, which includes:

setting multiple signal observation windows, wherein each of the signal observation windows is configured to display a signal with a corresponding signal presentation attribute;

setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region;

selecting a desired to-be-track-observed signal from the to-be-track-observed signal region to each of other signal observation windows to, with a corresponding signal presentation attribute, present the to-be-track-observed signal, wherein each signal observation window performs presentation independently.

The signal tracking and observation method provides a solution for tracking and observing a confounding signal, preventing a user from selecting an incorrect confounding signal with a same name and hence increasing the efficiency of tracking and observing the confounding signal.

Various non-limiting implementations of the embodiments of the present disclosure are detailed below in combination with drawings.

As shown in FIG. 1, one or more embodiments of the present disclosure provide a signal tracking and observation method, which includes the following steps.

At step S101, multiple signal observation windows are set, where each of the signal observation windows is configured to display a signal with a corresponding signal presentation attribute.

At step S102, a signal database is set; a to-be-track-observed signal is selected from the signal database, and the to-be-track-observed signal is added and displayed in one of the signal observation windows, where a region displaying the to-be-track-observed signal in the signal observation window is a to-be-track-observed signal region.

At step S103, a desired to-be-track-observed signal is selected from the to-be-track-observed signal region to each of other signal observation windows to, with a corresponding signal presentation attribute, present the to-be-track-observed signal, where each signal observation window performs presentation independently.

Specifically, when the user needs to display the to-be-track-observed signal in each of other signal observation windows to perform tracking and observation, it is only required to select the desired to-be-track-observed signal from the to-be-track-observed signal region to each of other signal observation windows, so as to achieve tracking and observation, without needing to select, each time, the desired to-be-track-observed signal from the signal database and adding it to each of other signal observation windows.

Specifically, the independent presentation of each signal observation window refers to that the user may create an independent window instance for displaying a different signal based on a presentation attribute of each signal observation window, where there is no correlation between different window instances. For example, the user may create three signal observation windows with the signal presentation attribute as graphics: a first signal observation window displays an engine-related signal curve, a second signal observation window displays a chassis-related signal curve, and a third signal observation window displays a gateway-forwarded signal curve. These three signal observation windows are not correlated with each other. The advantage of the independent presentation of each signal observation window is that: by independent presentation, the decoupling of the signal tracking and observation is achieved, and the user can observe different signals in different signal observation windows, improving the independence and flexibility of the configuration.

A method of selecting a to-be-track-observed signal from the signal database and adding and displaying the to-be-track-observed signal in one of the signal observation windows will be detailed below by way of an example.

As shown in FIG. 2, it is required to observe a curve of an EngSpeed signal in an EngineData packet sent by an Engine node in a Powertrain network on a channel 2 [CAN] bus. But, in the Powertrain network, a reception node Gateway of the Engine node and a DashBoard are present, and the Gateway node and the DashBoard include EngSpeed signals with the same name. Further, other packets, for example, EngineDataIEEEs, also include an EngSpeed signal with the same name. Therefore, the EngSpeed signal is a confounding signal.

Figure 3:
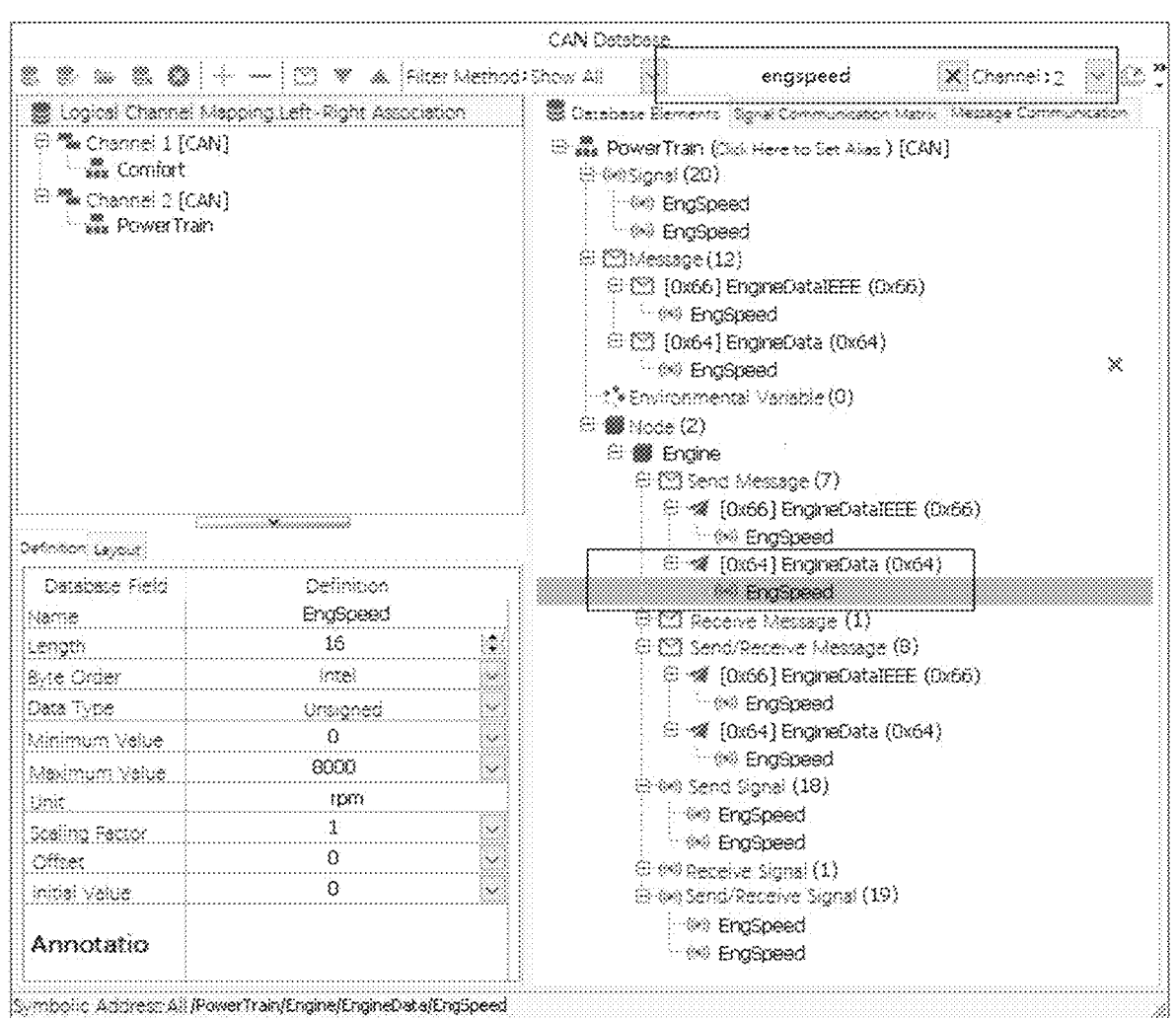
FIG. 3 is a schematic diagram of filtering "EngSpeed" signals in a CAN signal database according to some embodiments of the present disclosure.

As shown in FIG. 3, when filtering is performed with the name "EngSpeed" in a signal database of a software platform, multiple options may appear, and only the highlighted "EngSpeed" signal is a target signal to be track-observed in an EngineData packet sent by the Engine node.

Figures 4, 5:
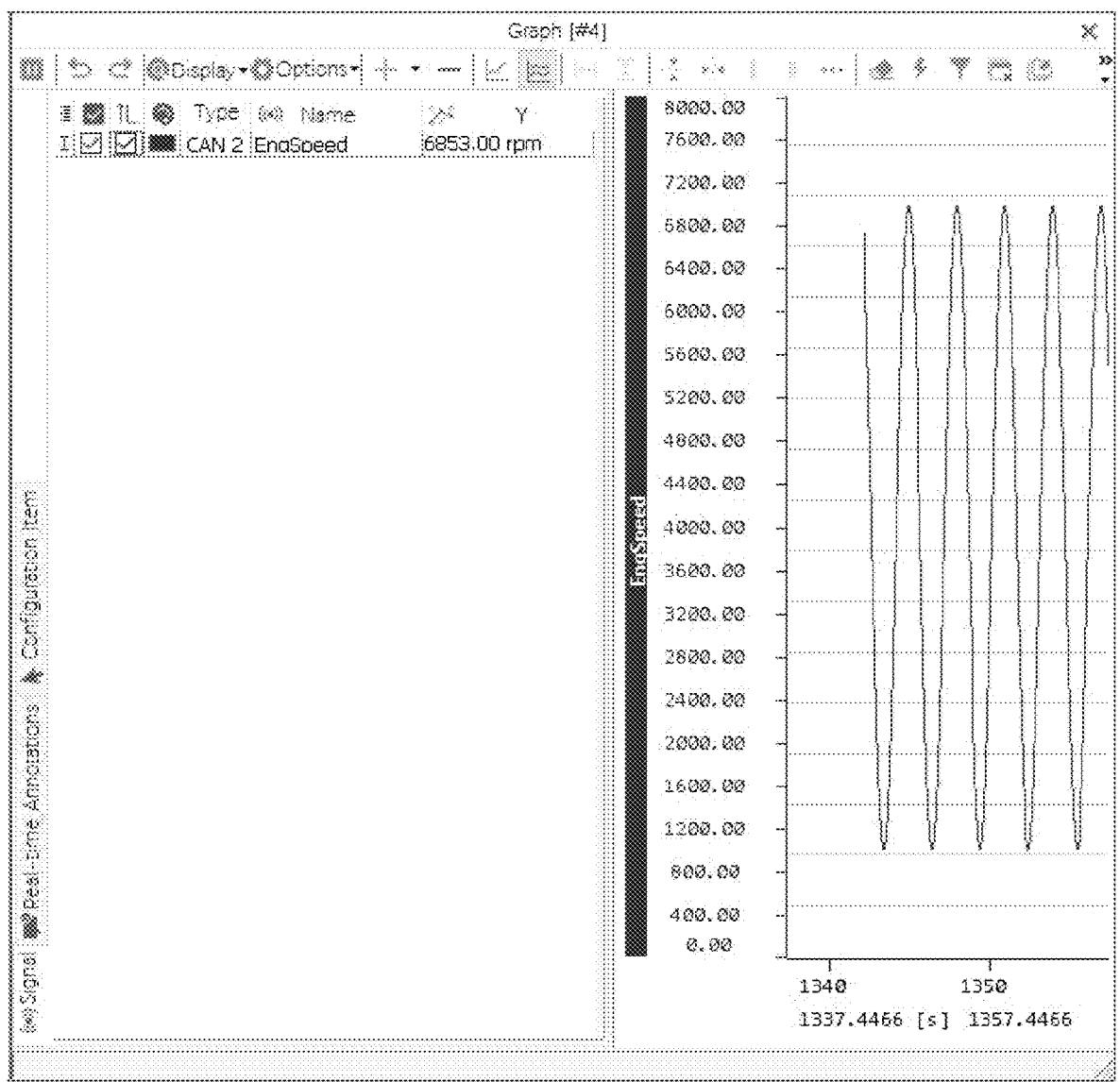
FIG. 4 is a schematic diagram of adding the selected "EngSpeed" signals to a graphic interface according to some embodiments of the present disclosure.
FIG. 5 is a schematic diagram illustrating a numerical display window according to some embodiments of the present disclosure.

As shown in FIG. 4, the selected "EngSpeed" signal is added to one signal observation window with a signal presentation attribute as graphics. The signal list region of the signal observation window may automatically add the "EngSpeed" signal, and execute a curve plotting operation of the "EngSpeed" signal, where the signal list region is the to-be-track-observed signal region.

In some embodiments, the signal presentation attribute includes at least one of a numerical presentation attribute, a dashboard presentation attribute, a histogram presentation attribute, a text presentation attribute and a graphic curve presentation attribute.

Figure 9:
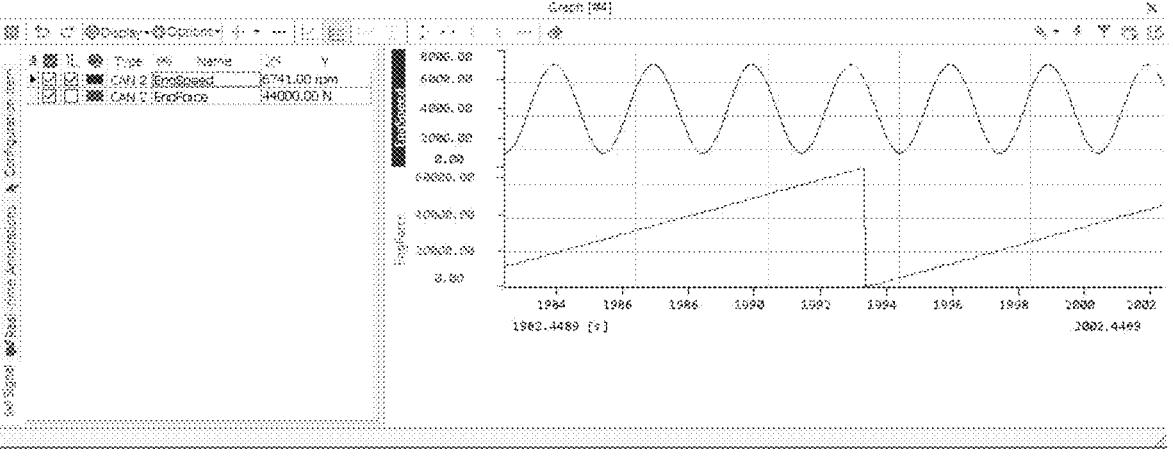
FIG. 9 is a schematic diagram illustrating a graphic window according to some embodiments of the present disclosure.

Specifically, as shown in FIG. 5, the signal observation window of the numerical presentation attribute is a numerical display window; as shown in FIG. 6, the signal observation window of the dashboard presentation attribute is a dashboard window; as shown in FIG. 7, the signal observation window of the histogram presentation attribute is a numerical display window with a histogram; as shown in FIG. 8, the signal observation window of the text presentation attribute is a text window; as shown in FIG. 9, the signal observation window of the graphic curve presentation attribute is a graphic window.

In some embodiments, a method of selecting the desired to-be-track-observed signal from the to-be-track-observed signal region to each of other signal observation windows includes:

dragging a selected object to a releasable region of a target signal observation window and releasing the selected object; where, the object is a text presentation corresponding to the desired to-be-track-observed signal.

In some embodiments, when the selected object is dragged, a drag configuration is created; and a method of creating the drag configuration includes:

identifying an object at a position for triggering a drag behavior, and obtaining signal database information associated with the object;

creating a drag configuration of json format, storing a handle of the signal observation window where the object is located into a window handle field of the drag configuration, and storing the signal database information of the object into a data content field of the drag configuration; and when the drag behavior is stopped and the selected object is released, analyzing, by the target signal observation window, the drag configuration to display the information of the selected object.

In some embodiments, the selected object is dragged by a drag widget to the releasable region of the target signal observation window;

when the drag widget does not move out of the signal observation window where the object is located, the drag widget icon displays a drag disable icon; and when the drag widget moves out of the signal observation window where the object is located, the drag widget icon displays a drag icon.

The drag widget includes, for example, but not limited to a mouse. When the drag widget is a mouse, a method of selecting the desired to-be-track-observed signal from the to-be-track-observed signal region to each of other signal observation windows includes:

pressing a left mouse button on a selected object;

press-holding the left mouse button and moving the mouse to drag the selected object to the releasable region of the target signal observation window;

releasing the left mouse button to release the selected object.

Specifically, the object refers to a text presentation corresponding to the desired to-be-track-observed signal selected from the to-be-track-observed signal region.

In some embodiments, the left mouse button is press-held on the selected object to create a drag configuration, and a method of creating the drag configuration includes:

identifying an object at a coordinate position of the mouse and obtaining signal database information associated with the object;

creating a drag configuration of json format, storing a handle of the signal observation window where the object is located into a window handle field of the drag configuration, and storing the signal database information of the object into a data content field of the drag configuration; and when the left mouse button is released to release the selected object, analyzing, by the target signal observation window, the drag configuration to display the information of the selected object.

The method of selecting the desired to-be-track-observed signal from the to-be-track-observed signal region to each of other signal observation windows and the method of press-holding the left mouse button on the selected object to create a drag configuration will be detailed below by way of an example.

For example, in a test process, it is required to track and observe, in a newly-created numerical display window, a confounding signal EngSpeed displayed in a graphic window, where the signal is located in the channel 2 [CAN] network and carried by the EngineData packet of the sending node Engine.

Figure 10:
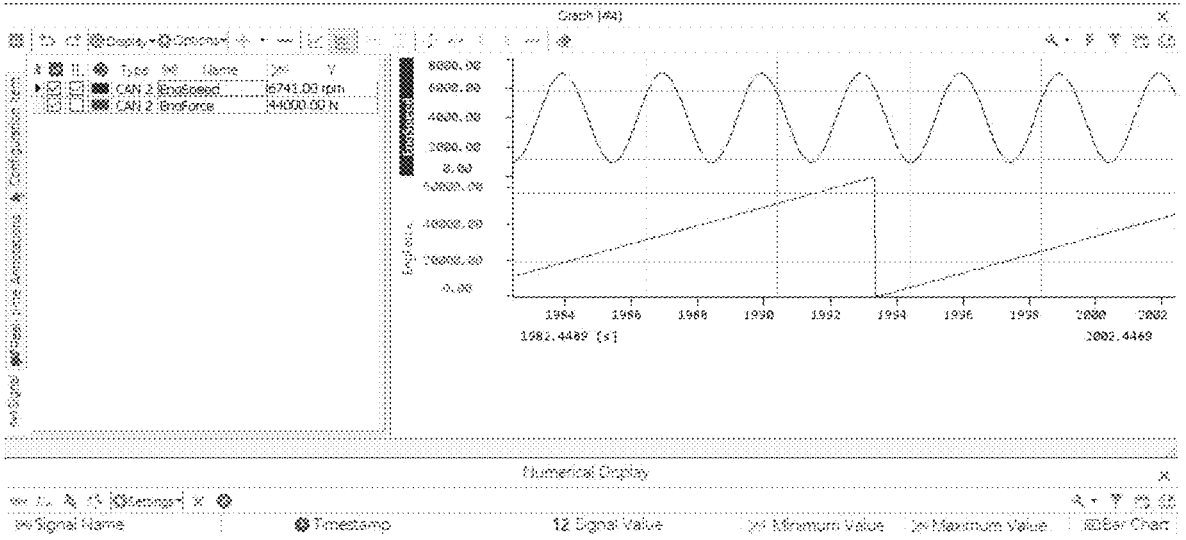
FIG. 10 is a schematic diagram in which an EngSpeed signal entry is clicked by left mouse button in a signal list region of a graphic window in a case according to some embodiments of the present disclosure.

As shown in FIG. 10, in order to achieve the tracking and observation, it is firstly required to press the EngSpeed signal entry by using the left mouse button and hold the left mouse button in the signal list region of the graphic window.

When the graphic window knows the left mouse button is pressed, the graphic window may know that the EngSpeed signal entry in the signal list region is pressed, based on x and y coordinate information of the mouse fed back by an interface control. At this step, the object at the coordinate position of the mouse is identified.

The graphic window may obtain, based on an attribute stored in the EngSpeed signal entry, obtain the signal database information associated with the object, as shown below:

1/PowerTrain/Engine/EngineData/EngSpeed wherein 1 represents a channel 2 [CAN], because the CAN channels are sorted from zero; Powertrain represents a network name, Engine represents a node name, EngineData represents a name of a packet sent by the node, and EngSpeed represents a signal name included in the packet.

after the signal database information pressed by the left mouse button and corresponding to the EngSpeed signal is obtained, the graphic window automatically creates a drag configuration of json format with information below:

```
{
  "type": "CAN",
  "handle": 135274968,
  "address": "1/PowerTrain/Engine/EngineData/EngSpeed"
}
``` where, the json format field includes three pieces of information, which are:

the value of the "type" is CAN, which indicates that the drag information is CAN signal;

the value of the "handle" is 135274968, which is a handle of the graphic window where the EngSpeed signal is located;

the value of the "address" is "1/PowerTrain/Engine/EngineData/EngSpeed", which indicates a signal database address of the drag signal.

Figure 11:
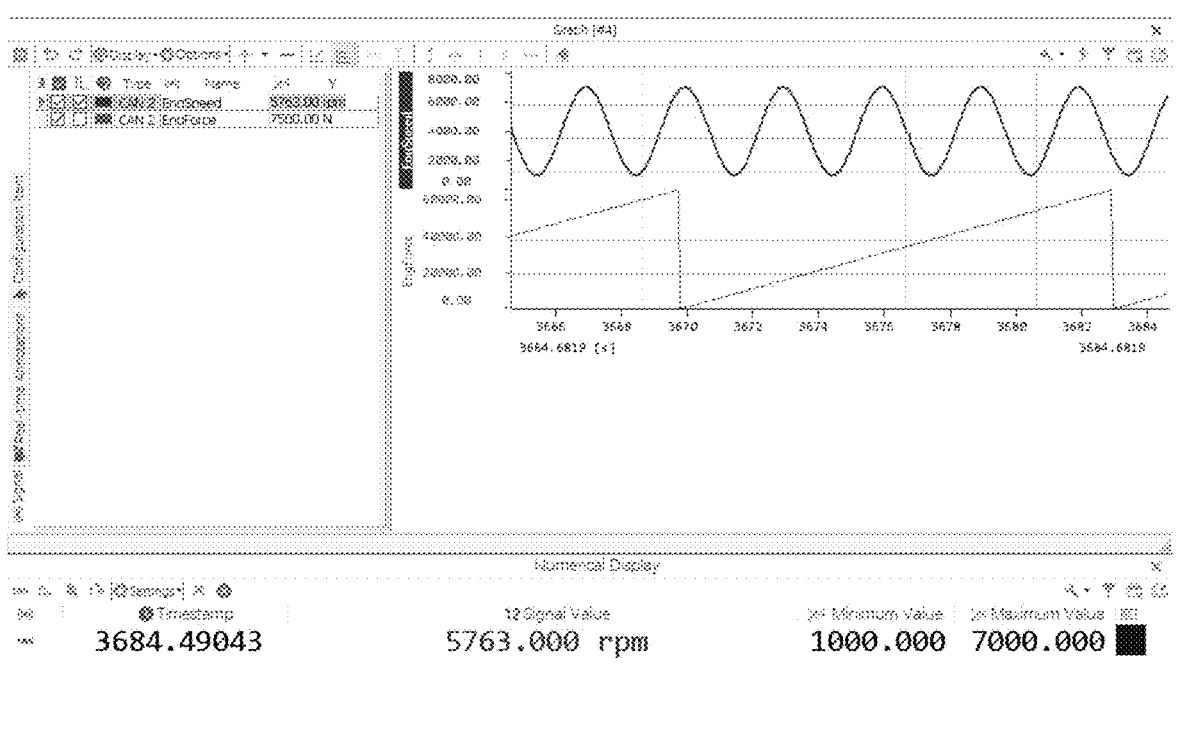
FIG. 11 is a schematic diagram in which an EngSpeed signal is dragged from a graphic window to a numerical display window in a case according to some embodiments of the present disclosure.

As shown in FIG. 11, when the user drags the EngSpeed signal to the numerical display window for releasing, the numerical display window can obtain a character string of the above json format and obtain the signal database information of the EngSpeed signal by analysis, and thus, add the EngSpeed signal in its own signal list region and display the value of the EngSpeed signal.

In some embodiments, the left mouse button is press-held while the mouse is moved:

when the mouse does not move out of the signal observation window where the object is located, the mouse icon displays a drag disable icon;

when the mouse moves out of the signal observation window where the object is located, the mouse icon displays a drag icon.

The case that when the mouse does not move out of the signal observation window where the object is located, the mouse icon displays a drag disable icon will be detailed below by way of an example.

Figure 12:
FIG. 12 is a schematic diagram in which a mouse icon displays a drag disable icon in a case according to some embodiments of the present disclosure.

As shown in FIG. 12, in a packet information window, the signal "EngSpeed" signal is dragged. When the left mouse button is press-held and the mouse does not leave the packet information window, the mouse icon displays a drag disable icon.

The case that when the mouse moves out of the signal observation window where the object is located, the mouse icon displays a drag icon will be detailed below by way of an example.

As shown in FIG. 13, when the left mouse button is press-held and the mouse leaves the packet information window, the mouse icon displays a drag icon.

In some embodiments, the signal tracking and observation method may further includes: modifying an observation mode of the object in the target signal observation window; and a method of modifying the observation mode of the object in the target signal observation window includes: changing a display attribute of the object.

The method of modifying the observation mode of the object in the target signal observation window will be detailed by way of an example.

As shown in FIG. 14, for example, in the graphic window, a line where the signal is located is double-clicked to pop up a signal observation mode setting window. The user may modify display attributes such as a line type, a line width and a connection point pattern of the signal and the like in the signal observation mode setting window.

Figure 15:
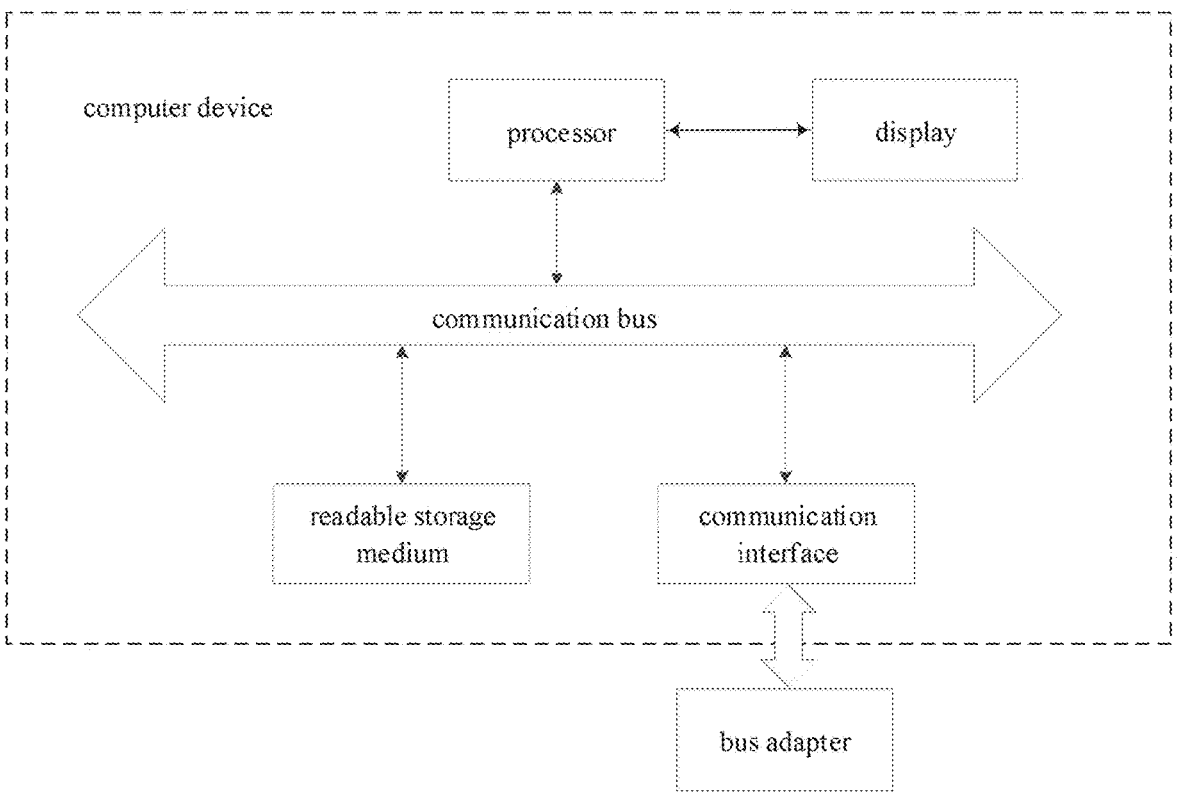
FIG. 15 is a principle block diagram illustrating a signal tracking and observation system according to some embodiments of the present disclosure.

As shown in FIG. 15, one or more embodiments further provide a signal tracking and observation system, which includes:

at least one bus adapter, configured to obtain signal data from a debugging device;

at least one computer device, including a processor, a display communicating with the processor to present a graphic interface, a readable storage medium, a communication bus, and a communication interface; wherein the processor, the readable storage medium, and the communication interface communicate with the bus adapter via the communication bus;

the readable storage medium is configured to store an instruction program;

the processor is configured to, after the signal data is obtained, execute the instruction program to perform the operations of: setting multiple signal observation windows, wherein each of the signal observation windows is configured to display a signal with a corresponding signal presentation attribute; setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; selecting a desired to-be-track-observed signal from the to-be-track-observed signal region to each of other signal observation windows to, with a corresponding signal presentation attribute, present the to-be-track-observed signal, wherein each signal observation window performs presentation independently;

the display is configured to display at least one signal observation window by the graphic interface.

The data of the signal database is data obtain from the debugging device.

One or more embodiments further provide a method, including obtaining signal data from a debugging device via a bus adapter;

after the signal data is obtained, setting multiple signal observation windows, wherein each of the signal observation windows is configured to display a signal with a corresponding signal presentation attribute; setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; selecting a desired to-be-track-observed signal from the to-be-track-observed signal region to each of other signal observation windows to, with a corresponding signal presentation attribute, present the to-be-track-observed signal, wherein each signal observation window performs presentation independently; displaying at least one signal observation window via a graphic interface.

Figure 16:
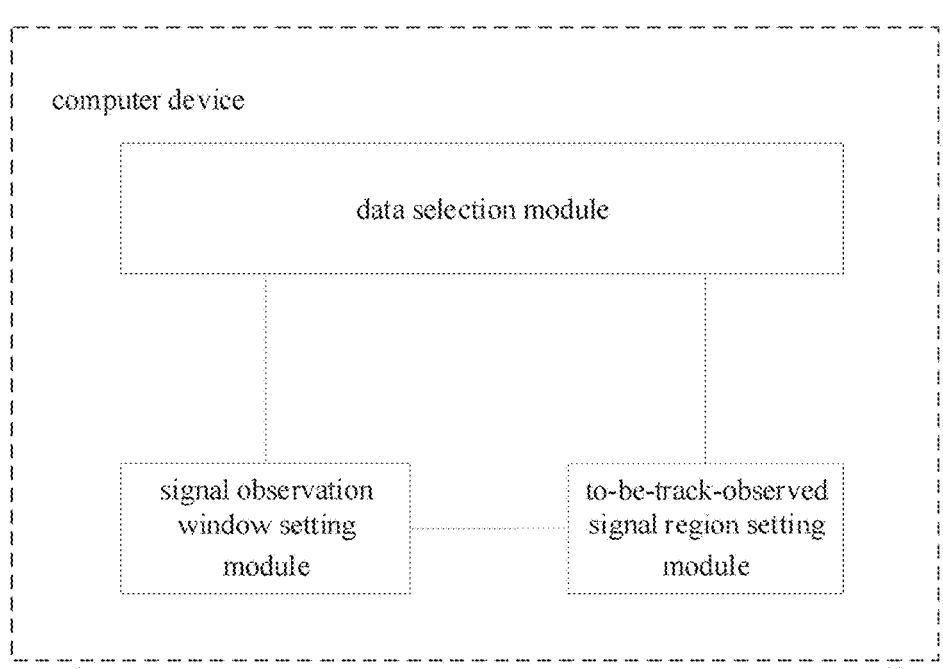
FIG. 16 is a principle block diagram illustrating a signal tracking and observation system according to some embodiments of the present disclosure.

As shown in FIG. 16, one or more embodiments further provide a signal tracking and observation system, including: a computer device, configured to execute a signal observation window setting module, a to-be-track-observed signal region setting module and a data selection module; wherein the signal observation window setting module is configured to set multiple signal observation windows, wherein each of the signal observation windows is configured to display a signal with a corresponding signal presentation attribute;

the to-be-track-observed signal region setting module is configured to set a signal database, select a to-be-track-observed signal from the signal database, and add and display the to-be-track-observed signal in one of the signal observation windows, wherein a region displaying the to-be-track-observed signal in the signal observation window is a to-be-track-observed signal region;

the data selection module is configured to select a desired to-be-track-observed signal from the to-be-track-observed signal region to each of other signal observation windows to, with a corresponding signal presentation attribute, present the to-be-track-observed signal, wherein each signal observation window performs presentation independently.

The computer instructions corresponding to the specific implementation functions of the signal observation window setting module, the to-be-track-observed signal region setting module and the data selection module are stored in a computer readable storage medium and implemented in a computer device. For details, reference may be made to the contents of the preceding signal tracking and observation method and no redundant descriptions are made herein.

Figures 17, 18:
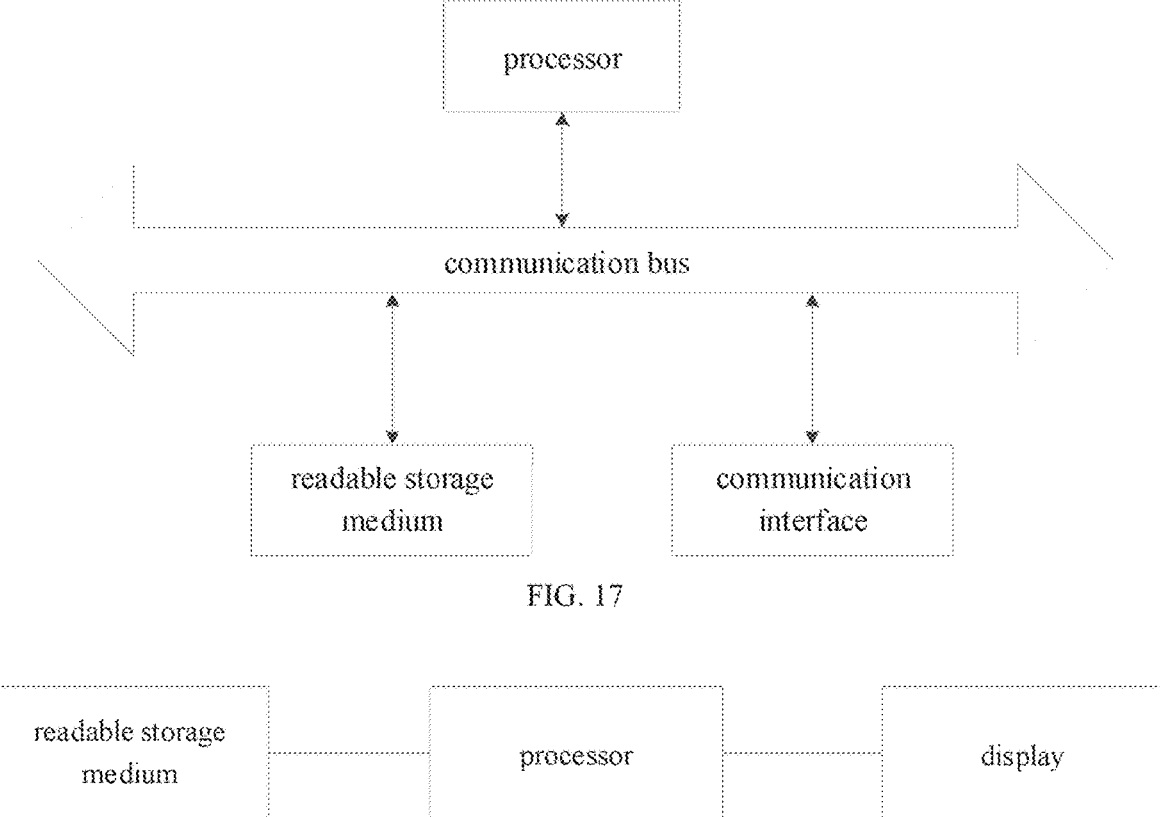
FIG. 17 is a principle block diagram illustrating an apparatus according to some embodiments of the present disclosure.
FIG. 18 is a principle block diagram illustrating an electronic device according to some embodiments of the present disclosure.

As shown in FIG. 17, one or more embodiments further provide an apparatus, including:

at least one readable storage medium storing instructions;

at least one processor, which executes the instructions to perform the operations of: setting multiple signal observation windows, wherein each of the signal observation windows is configured to display a signal with a corresponding signal presentation attribute; setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; selecting a desired to-be-track-observed signal from the to-betrack-observed signal region to each of other signal observation windows to, with a corresponding signal presentation attribute, present the to-be-track-observed signal, wherein each signal observation window performs presentation independently.

As shown in FIG. 18, one or more embodiments further provide an electronic device, including: a processor, a display communicating with the processor to present a graphic interface, and a readable storage medium, wherein the readable storage medium is configured to store an instruction program;

the processor is configured to execute the instruction program to perform the operations of: setting multiple signal observation windows, wherein each of the signal observation windows is configured to display a signal with a corresponding signal presentation attribute; setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; selecting a desired to-be-track-observed signal from the to-be-track-observed signal region to each of other signal observation windows to, with a corresponding signal presentation attribute, present the to-be-track-observed signal, wherein each signal observation window performs presentation independently;

the display is configured to display at least one signal observation window by the graphic interface.

In some embodiments, the computer device, the industrial personal computer and apparatus may also be used as one of the electronic devices.

The structures shown in FIGS. 17 and 18 do not constitute any limitation to the electronic device, and the electronic device may further include more or less components than shown in the drawings or combine some components or have different component deployments.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as WI-FI interface, Bluetooth interface and the like), which is usually used to establish communication connection between the server and other computer devices.

The readable storage medium or the computer readable storage medium includes at least one type of memories. The memory includes flash memory, harddisk drive, multimedia card, card type memory (e.g. SD memory or the like), magnetic memory, magnetic disk or compact disk or the like. In some embodiments, the memory may be an internal storage unit in the computer device, for example, a harddisk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit in the computer device and the external storage device. The memory may be used to not only store an application software installed on the computer device and various types of data, for example, the codes of the computer programs and the like but also temporarily store data already output or to be output.

In some embodiments, the processor may be a central processing unit (CPU), a processor, a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

In some embodiments, the processor executes the program to perform the steps in the embodiment of the signal tracking and observation method shown in FIG. 1, for example, the steps S101 to S103 shown in FIG. 1. Alternatively, the processor executes the computer program to implement the functions of the modules or units in each apparatus embodiment.

One or more embodiments further provide a computer readable storage medium configured to store programs of performing any one of the above signal tracking and observation methods.

One or more embodiments further provide a computer readable storage medium, storing computer readable instructions. The computer readable instructions are executed by at least one processor to perform the above signal tracking and observation method, which specifically includes: setting multiple signal observation windows, wherein each of the signal observation windows is configured to display a signal with a corresponding signal presentation attribute; setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region, selecting a desired to-be-track-observed signal from the to-be-track-observed signal region to each of other signal observation windows to, with a corresponding signal presentation attribute, present the to-be-track-observed signal, wherein each signal observation window performs presentation independently. For details, reference may be made to the specific descriptions of the signal tracking and observation method and no redundant descriptions are made herein.

One or more embodiments of the present disclosure further provide a computer program product, including computer programs or instructions, where the computer programs or instructions are executed on a computer to cause the computer to perform any one of the above signal tracking and observation methods.

One or more embodiments of the present disclosure further provide a computer program product, which includes a computer readable storage medium storing computer readable program codes including instructions. These instructions cause at least one processor or at least one computer device to perform the operations of: setting multiple signal observation windows, wherein each of the signal observation windows is configured to display a signal with a corresponding signal presentation attribute; setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; selecting a desired to-be-track-observed signal from the to-be-track-observed signal region to each of other signal observation windows to, with a corresponding signal presentation attribute, present the to-be-track-observed signal, wherein each signal observation window performs presentation independently.

For details, reference may be made to the detailed descriptions of the above signal tracking and observation method and no redundant descriptions are made herein.

Figure 19:
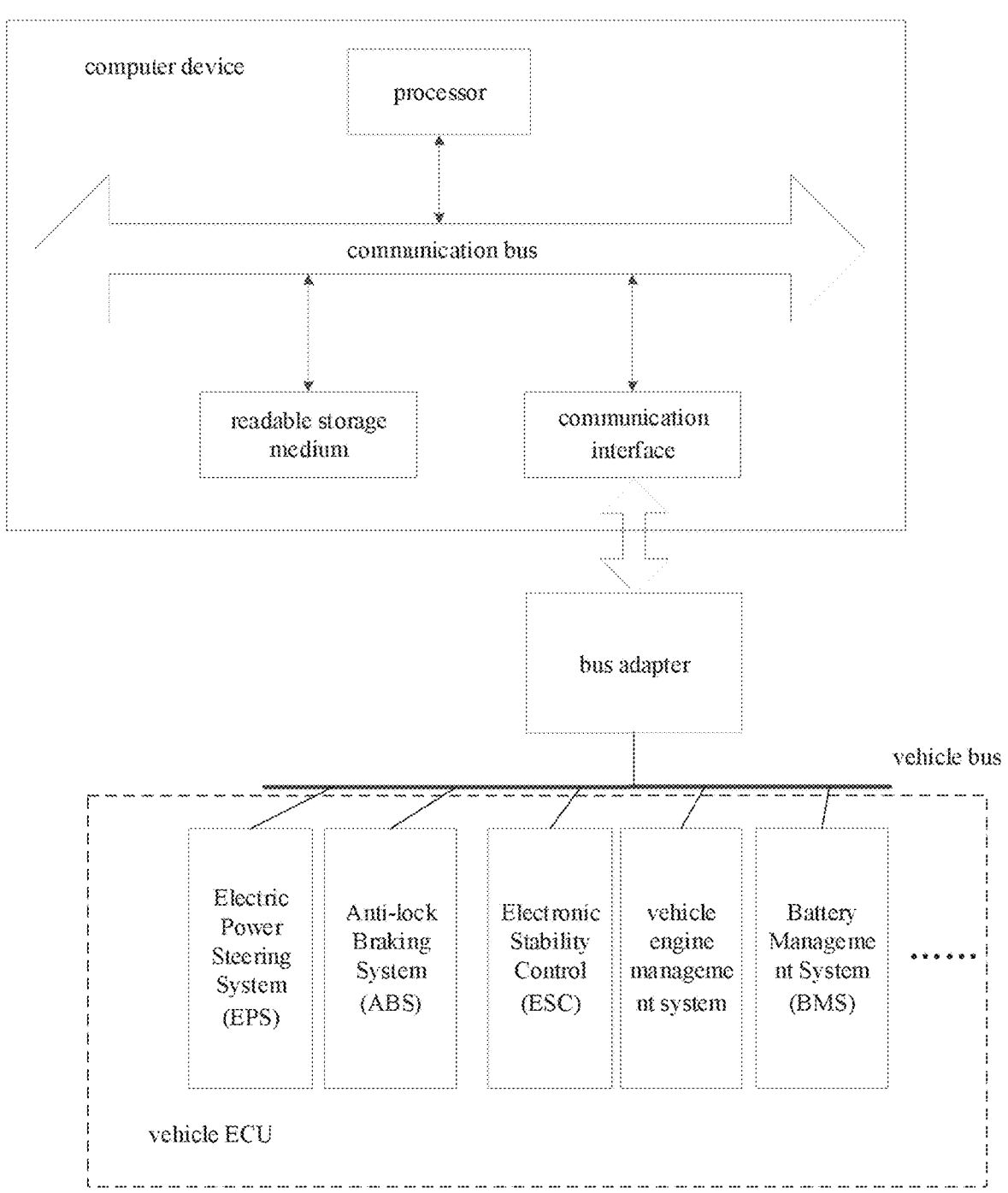
FIG. 19 is a principle block diagram illustrating a system according to some embodiments of the present disclosure.

As shown in FIG. 19, one or more embodiments further provide a system, which includes:

a computer device and a bus adapter; where, the computer device includes a processor, a readable storage medium, a communication bus and a communication interface; where, the processor, the readable storage medium and the communication interface communicate with the bus adapter via the communication bus so as to obtain signal data from a debugging device;

the readable storage medium is configured to store an instruction program;

the processor is configured to, after signal data is obtained, execute the instruction program to perform the operations of: setting multiple signal observation windows, wherein each of the signal observation windows is configured to display a signal with a corresponding signal presentation attribute; setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; selecting a desired to-be-track-observed signal from the to-be-track-observed signal region to each of other signal observation windows to, with a corresponding signal presentation attribute, present the to-be-track-observed signal, wherein each signal observation window performs presentation independently.

In some embodiments, the bus adapter may be a Controller Area Network (CAN) bus adapter, a Controller Area Network Flexible Data Rate (CANFD) bus adapter, a Fast Local Interconnect Network (FastLIN) bus adapter, a Local Interconnect Network (LIN) bus adapter, an Ethernet bus adapter, a FlexRay bus adapter, or may be one-to-many or many-to-many. In some other embodiments, no limitation is made to the specific implementation of the bus adapter.

In some embodiments, corresponding data source may be obtained by communicating with the debugging device based on Unified Diagnostic Services (UDS) or Universal Measurement and Calibration Protocol (XCP) or CAN Calibration Protocol (CCP) protocol.

In some embodiments, signal data may also be obtained from the debugging device by communicating with the debugging device, for example, vehicle Electronic Control Unit (ECU) device and its relevant systems based on UDS or XCP or CCP protocol.

In some embodiments, the debugging device may cover the calibration scenarios of vehicles, aerospace, ships, machinery and automation. For the vehicles, the debugging device may specifically be a vehicle ECU and its relevant systems which include but not limited to Electric Power Steering System (EPS), Anti-lock Braking System (ABS), Electronic Stability Control (ESC), vehicle engine management system and Battery Management System (BMS) and the like, which can be connected to the apparatus, or the electronic device or the computer device via a bus to achieve data reception.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as independent products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. A signal tracking and observation system, comprising:
a bus adapter, configured to obtain signal data from a debugging device;
a computer device, comprising a processor, a display communicating with the processor to present a graphic interface, a readable storage medium, a communication bus, and a communication interface; wherein the processor, the readable storage medium, and the communication interface communicate with the bus adapter via the communication bus;
the readable storage medium is configured to store an instruction program;
the processor is configured to, after the signal data is obtained, execute the instruction program to perform operations of:
setting multiple signal observation windows, wherein each of the signal observation windows is configured to display a signal with a corresponding signal presentation attribute;
setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; and
selecting a desired to-be-track-observed signal from the to-be-track-observed signal region to each of other signal observation windows to, with a corresponding signal presentation attribute, present the to-be-track-observed signal, wherein each signal observation window performs presentation independently;
wherein, when the desired to-be-track-observed signal is selected for presentation in another signal observation window, a drag configuration of JSON format is created, the drag configuration comprising a window handle field storing a handle of the signal observation window where the object is located and a data content field storing signal database information of the object, and wherein, when the drag behavior is stopped and the selected object is released, the target signal observation window analyzes the drag configuration to display the information of the selected object; and
the display is configured to display at least one signal observation window by the graphic interface.

2. The signal tracking and observation system of claim 1, wherein the processor is further configured to perform operations of:
dragging a selected object to a releasable region of a target signal observation window and releasing the selected object; wherein
the object is a text presentation corresponding to the desired to-be-track-observed signal.

3. The signal tracking and observation system of claim 2, wherein
the selected object is dragged by a drag widget to the releasable region of the target signal observation window;
when the drag widget does not move out of the signal observation window where the object is located, a drag widget icon displays a drag disable icon; and
when the drag widget moves out of the signal observation window where the object is located, the drag widget icon displays a drag icon.

4. The signal tracking and observation system of claim 1, wherein the processor is further configured to perform operations of:
modifying an observation mode of the object in the target signal observation window by changing a display attribute of the object.

5. The signal tracking and observation system of claim 1, wherein the signal presentation attribute comprises: at least one of a numerical presentation attribute, a dashboard presentation attribute, a histogram presentation attribute, a text presentation attribute and a graphic curve presentation attribute.

6. The signal tracking and observation system of claim 1, wherein the debugging device is a vehicle Electronic Control Unit (ECU) device.

7. A system, comprising:

a computer device and a bus adapter; wherein the computer device comprises a processor, a readable storage medium, a communication bus and a communication interface; wherein the processor, the readable storage medium and the communication interface communicate with the bus adapter via the communication bus so as to obtain signal data from a debugging device;

the readable storage medium is configured to store an instruction program;

the processor is configured to, after the signal data is obtained, execute the instruction program to perform operations of:

setting multiple signal observation windows, wherein each of the signal observation windows is configured to display a signal with a corresponding signal presentation attribute;

setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region; and selecting a desired to-be-track-observed signal from the to-be-track-observed signal region to each of other signal observation windows to, with a corresponding signal presentation attribute, present the to-be-track-observed signal, wherein each signal observation window performs presentation independently;

wherein, when the desired to-be-track-observed signal is selected for presentation in another signal observation window, a drag configuration of JSON format is created, the drag configuration comprising a window handle field storing a handle of the signal observation window where the object is located and a data content field storing signal database information of the object, and wherein, when the drag behavior is stopped and the selected object is released, the target signal observation window analyzes the drag configuration to display the information of the selected object.

8. The system of claim 7, wherein the processor is further configured to perform operations of:

dragging a selected object to a releasable region of a target signal observation window and releasing the selected object; wherein the object is a text presentation corresponding to the desired to-be-track-observed signal.

9. The system of claim 8, wherein the selected object is dragged by a drag widget to the releasable region of the target signal observation window;

when the drag widget does not move out of the signal observation window where the object is located, a drag widget icon displays a drag disable icon; and when the drag widget moves out of the signal observation window where the object is located, the drag widget icon displays a drag icon.

10. The system of claim 7, wherein the processor is further configured to perform operations of:

modifying an observation mode of the object in the target signal observation window by changing a display attribute of the object.

11. The system of claim 7, wherein the signal presentation attribute comprises: at least one of a numerical presentation attribute, a dashboard presentation attribute, a histogram presentation attribute, a text presentation attribute and a graphic curve presentation attribute.

12. The system of claim 7, wherein the debugging device is a vehicle Electronic Control Unit (ECU) device.

13. A method, comprising:

obtaining signal data from a debugging device via a bus adapter;

after the signal data is obtained, setting multiple signal observation windows, wherein each of the signal observation windows is configured to display a signal with a corresponding signal presentation attribute;

setting a signal database, selecting a to-be-track-observed signal from the signal database, and adding and displaying the to-be-track-observed signal in one of the signal observation windows, wherein a region displaying the to-be-track-observed signal in the signal observation window is a to-be-track-observed signal region;

selecting a desired to-be-track-observed signal from the to-be-track-observed signal region to each of other signal observation windows to, with a corresponding signal presentation attribute, present the to-be-track-observed signal, wherein each signal observation window performs presentation independently;

wherein, when the desired to-be-track-observed signal is selected for presentation in another signal observation window, a drag configuration of JSON format is created, the drag configuration comprising a window handle field storing a handle of the signal observation window where the object is located and a data content field storing signal database information of the object, and wherein, when the drag behavior is stopped and the selected object is released, the target signal observation window analyzes the drag configuration to display the information of the selected object; and displaying at least one signal observation window via a graphic interface.

14. The method of claim 13, further comprising:

dragging a selected object to a releasable region of a target signal observation window and releasing the selected object; wherein the object is a text presentation corresponding to the desired to-be-track-observed signal.

15. The method of claim 14, wherein the selected object is dragged by a drag widget to the releasable region of the target signal observation window;

when the drag widget does not move out of the signal observation window where the object is located, a drag widget icon displays a drag disable icon; and when the drag widget moves out of the signal observation window where the object is located, the drag widget icon displays a drag icon.

16. The method of claim 13, further comprising:

modifying an observation mode of the object in the target signal observation window by changing a display attribute of the object.

17. The method of claim 13, wherein the signal presentation attribute comprises: at least one of a numerical presentation attribute, a dashboard presentation attribute, a histogram presentation attribute, a text presentation attribute and a graphic curve presentation attribute.

\* \* \* \* \*